(12) United States Patent
Gotta

(10) Patent No.: X7430
(45) Date of Patent: Feb. 18, 1833

(54) COOKING STOVE, COAL OR WOOD

(76) Inventor: Leopold Gotta same principle as before described.

In the steamer for cooking meat is placed a cullender or perforated sheet of tin, upon which the meat is placed: the steam then enters from a separate pipe in the large boiler, & passes thro' underneath the cullender: the watery particles from the steam are received into a cylindrical vessel attached to the steam pipe & can be drawn off by a cock; thus the meat is cooked by the steam.

The steamer for cooking vegetables acts in the same manner.

<u>The cap or cover</u> for the steam apparatus; with the <u>pulleys</u> & frame.
The cap is made of thin sheet iron, & exactly of the size of the stove it entirely covers the large boiler & steamers & receives the steam from the steamers passing thro' the long pipes in the tops of the same: the steam is then carried off by a separate pipe in the top of the cap or cover.

The cap is connected to the large boiler by the iron frame, the sides of which frame passing thro' the openings in the projection on the sides of the large boiler.

The cap or cover is raised & lowered by the hand by two pulleys or rollers placed on the frame, over which a cord or chain passes secured to the top of the cap.

When neither of the boilers are wanted they are removed & lids or covers placed over the openings in the top of the stove.

<u>The Bake oven for Bread</u>, is placed in the pipe or flue, around which the smoke passes: it is made of sheet iron & is adapted to suit the size of the stove exactly. The smoke is made to circulate round the oven by means of a casing. It has a door in front for putting in & taking out the bread; and is also enclosed by the cap; the flue passing thro' an opening left in the back part of the cap.

Another oven for baking cakes is formed in the same manner as that for baking bread; except that the smoke passes under the bottom instead of around it, being without any casing: it is made moveable by the joints of the stove pipe: this is also covered by the cap or cover.

There are joints in the flue by which the oven may be raised or lowered, the flue being made sufficiently long for that purpose.

Operation.

Fuel being applied to the stove, & the large boiler filled with water, the heated water operates on the vessels containing the articles to be cooked: & the steam arising from the articles cooking passes up the long pipes into the cover; from thence it passes off thro' the large tube in the top of the cover.

The boiler is filled with water thro' the pipe which also acts as a Gauge.

The water disengaged from the vegetables &c. is drawn off by the cocks placed near the bottom of each vessel: the articles to be cooked being placed upon sheets of tin perforated with holes.

The baking in the ovens is performed by placing the bread &c. in pans, & putting it into the oven & closing the doors; the smoke circulating round the casing.

The cap or cover when not in use is raised by the cord & pulleys. There is a door in the side of the cap to examine the state of the steamers, &c.

The invention here claimed & desired to be secured by Letters Patent is the before described Cooking Stove.

For a further illustration of my invention I refer to the model & drawings of the same deposited in the Patent Office.

In testimony whereof I have hereunto subscribed my name before two witnesses this 12th day of February 1833.

Witnesses
Wm P. Elliot
Wm G. Cranch

Leopold Gotta

Exd
JHC 1170 words.)